US008406603B2

(12) United States Patent
Daigle et al.

(10) Patent No.: US 8,406,603 B2
(45) Date of Patent: Mar. 26, 2013

(54) SYSTEM AND METHOD OF RECORDING PROGRAMS OF FAVORITE CHANNELS

(75) Inventors: Brian K. Daigle, Atlanta, GA (US); Nicholas Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 443 days.

(21) Appl. No.: 12/481,135

(22) Filed: Jun. 9, 2009

(65) Prior Publication Data
US 2010/0310237 A1 Dec. 9, 2010

(51) Int. Cl.
*H04N 5/92* (2006.01)
(52) U.S. Cl. .......................................... 386/241; 386/239
(58) Field of Classification Search .................. None
See application file for complete search history.

(56) References Cited

U.S. PATENT DOCUMENTS

| | | | |
|---|---|---|---|
| 6,177,931 B1 | 1/2001 | Alexander | |
| 6,665,017 B1 | 12/2003 | Raiyat | |
| 2002/0154700 A1* | 10/2002 | Tardif | 375/240.25 |
| 2005/0044570 A1 | 2/2005 | Poslinski | |
| 2005/0157217 A1* | 7/2005 | Hendricks | 348/734 |
| 2005/0160456 A1 | 7/2005 | Moskowitz | |
| 2006/0195658 A1* | 8/2006 | Kanbe et al. | 711/114 |
| 2007/0041705 A1 | 2/2007 | Bontempi | |
| 2007/0118848 A1* | 5/2007 | Schwesinger et al. | 725/9 |
| 2007/0174862 A1* | 7/2007 | Kushida et al. | 725/15 |
| 2007/0273753 A1* | 11/2007 | Lee | 348/14.02 |
| 2008/0016526 A1* | 1/2008 | Asmussen | 725/34 |
| 2008/0216136 A1* | 9/2008 | Pfeffer et al. | 725/100 |

\* cited by examiner

*Primary Examiner* — William C Vaughn, Jr.
*Assistant Examiner* — Eileen Adams
(74) *Attorney, Agent, or Firm* — Toler Law Group, PC

(57) ABSTRACT

Systems and methods for recording of channels are provided. In a particular method, a first window of the plurality of windows is designated to display a first program of a first channel and a second window of the plurality of windows is designated to display a second program of a second channel. The first channel and the second channel are each included in a set of channels. The method also includes automatically recording the first program associated with the first channel while the first program is in progress and automatically recording the second program associated with the second channel while the second program is in progress. The method further includes sending a start of program option to a display device. In response to a selection of the start of program option, a recorded displayed program in progress is automatically replayed from a beginning of the displayed program at the display device.

19 Claims, 9 Drawing Sheets

SYSTEM AND METHOD OF RECORDING PROGRAMS OF FAVORITE CHANNELS

FIELD OF THE DISCLOSURE

The present disclosure relates generally to recording programs of favorite channels.

BACKGROUND

Television viewing is part of daily life for many people. The wealth of content available from television service providers allows many people to find entertaining and informative programming. Computing devices that are coupled to or integrated with television devices can augment television viewing by providing additional functions. For example, set-top box devices can run applications to provide program guides, games, and other content. The wealth of programming and functionality of television systems leaves a television viewer with many choices including the choice to initiate or schedule recording of television programs. A user may be inconvenienced when the user wants to see a particular program that has not been scheduled for recording and that has already begun. In this case, the user may have to wait until a subsequent broadcast time to watch or record the particular program.

DETAILED DESCRIPTION

In a particular illustrative embodiment, a first window of a plurality of windows is designated to display a first program of a first channel and a second window of the plurality of windows is designated to display a second program of a second channel. The first and second windows may be part of a mosaic display or a television or other display device. The first channel and the second channel may be included in a set of favorite channels. A method includes automatically recording the first program associated with the first channel while the first program is in progress and automatically recording the second program associated with the second channel while the second program is in progress. The method further includes display of a start of program option at the display device. In response to a selection of the start of program option, a previously recorded program in progress (e.g., the first program or the second program), is automatically replayed from a beginning of the displayed program at the display device.

In another embodiment, a system includes a display control component to communicate a display including a plurality of windows to a display device. A first window of the plurality of windows is designated to display content of a first channel and a second window of the plurality of windows is designated to display content of a second channel. Each of the first and second windows is adapted to be enlarged to a larger size window. The system includes a selection component to receive a selection of a start of program option associated with a particular window. In response to selection of the start of program option associated with the particular window, a recording of a displayed program in progress in the particular window is replayed from a beginning of the displayed program in progress.

In another embodiment, a computer-readable storage medium is disclosed that comprises operational instructions that, when executed by a processor, cause the processor to present content of a first program of a first channel for display at a first window at a display device and to present content of a second program of a second channel for display at a second window at the display device. The operational instructions further cause the processor to initiate automatic recording of the first program and the second program while the first and second program are in progress. The operational instructions also cause the processor to present for display a control element, where selection of the control element causes a particular program in progress to be displayed from a beginning of the particular program. The control element may be a displayed selectable icon.

Figure 1:
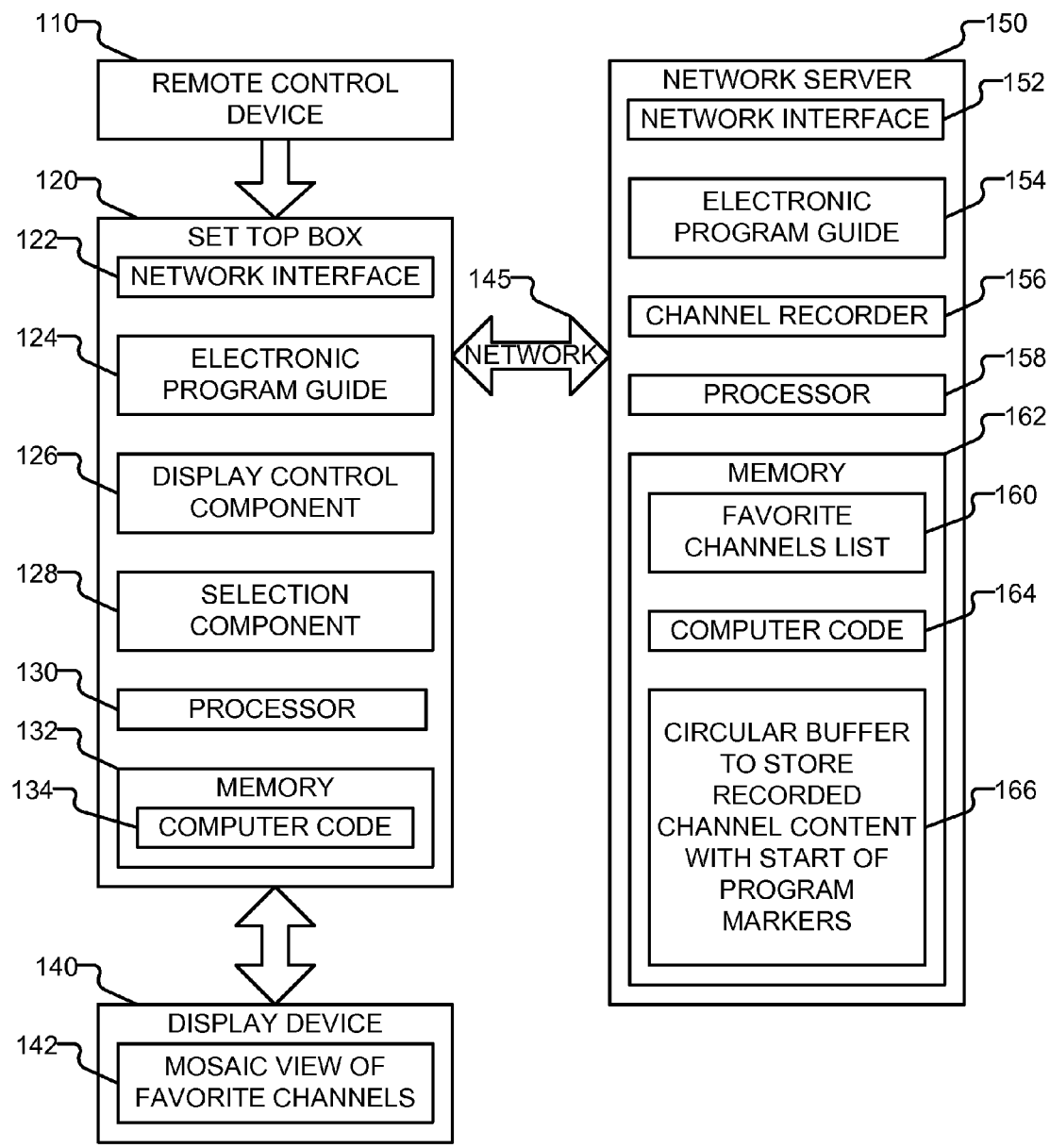
FIG. 1 is a block diagram of a first illustrative embodiment of a system to record programs of favorite channels.

FIG. 1 is a block diagram of a first illustrative embodiment of a system to automatically record programs of multiple channels. The system may include a remote control device 110, a set top box 120, and a display device 140, such as a television that displays a mosaic view of favorite channels 142. The system may also include a network server 150 that may be located remote from the set top box 120. The set top box 120 and the network server 150 are in communication via a network 145. The network 145 may be a public network, such as the Internet, or a private network. In a particular embodiment, the system of FIG. 1 provides automatic recording of programs of the favorite channels displayed by the mosaic view 142 and replays a selected program in progress from the start of the selected program.

The set top box 120 has a network interface 122 to enable communications between the set top box 120 and the network server 150 via the network 145. An electronic program guide 124, that may be downloaded from the network server 150, may provide program start time information, the durations of programs, the titles of programs, actors appearing in the programs, and brief descriptions of the programs, or any combination thereof. A user may view a display of the electronic program guide 124 by selecting a key on the remote control device 110.

The set top box 120 may include a display control component 126 to communicate a display interface including a plurality of windows to the display device 140. In one embodiment, a first window of the plurality of windows is designated to display content of a first favorite channel and a second window of the plurality of windows is designated to display content of a second favorite channel. In addition, other additional windows can be designated to display content of other favorite channels. Thus, a plurality of channels can be displayed in a mosaic view 142 that includes multiple windows within the full screen. For example, the mosaic view may display 8 windows with each window displaying content of a currently broadcasted program of a particular channel. The user can initiate or can cease display of the multiple window (i.e., mosaic) view by using the remote control device 110. The display control component 126 may also cause the display of a selected program in an enlarged window, such as a full screen window.

The set top box 120 may include a selection component 128 to produce a selection control element for display at the display device 140. In a particular embodiment, when the selection control element is selected, a program in progress is displayed from the beginning of the program. For example, the selection control element may include a button labeled "RESTART." The user may select the button using the keys of the remote control device 110.

In one embodiment, the set top box 120 includes a processor 130. The processor 130 may execute computer code 134 that may be stored in a memory 132. Execution of the computer code 134 may cause the set top box 120 to perform various functions. For example, these functions may include displaying a plurality of windows at the display device 140 where a first window shows a first program of a first channel and a second window shows a second program of a second channel. The functions may also include displaying a start of program option that, when selected, causes the display device 140 to display a selected program in progress starting from the beginning of the program. The functions may also include displaying a selected program in an enlarged view, such as in a large or full sized window.

The network server 150 may be located remote from the display device 140 in a location having numerous network servers to serve a large number of user locations (e.g., television subscriber residences). The network server 150 has a network interface 152 to enable the network server 150 to communicate with a plurality of set top boxes via the network 145. The network server 150 may have an electronic program guide 154 that can be downloaded to set top boxes, (e.g., the set top box 120), connected to the network 145. In some embodiments, the electronic program guide 154 is used to determine a location of start of program markers in a program that is being recorded.

In a particular embodiment, the network server 150 includes a channel recorder 156. The channel recorder 156 may record programs of favorite channels from a favorite channels list 160 located in a memory 162 of the network server 150. The favorite channels list 160 of a user can be uploaded from the set top box 120. The set top box 120 may receive the favorite channels list 160 via user input or may determine favorite channels by observation of user viewing habits. The programs of the channels in the favorite channels list 160 may be recorded into a circular buffer 166 of the memory 162. In a particular embodiment, start of program markers are inserted into the recordings at the start of each program. The start time of each program can be determined from the electronic program guide 154.

In a particular embodiment, the network server 150 includes a processor 158. The processor 158 may execute computer code 164 stored in the memory 162. Execution of the computer code 164 may cause the network server 150 to perform various functions. These functions may include automatically recording content of programs of favorite channels, inserting start of program markers in the recorded content, and transmitting a recorded program starting from the beginning of the program in response to a user request.

In operation, the network server 150 may automatically record programs of channels that are included in at least one user's favorite channels list 160. A first favorite channels list can be stored for a first user, and a second favorite channels list can be stored for a second user. Thus, multiple users can each have his or her own list of favorite channels and the programs of the favorite channels in each list can all be automatically recorded. A user at the display device 140 may choose to simultaneously display the user's favorite channels in a mosaic view, such as mosaic view 142 at display device 140. The mosaic view may include a plurality of windows, each particular window showing the content of a program of a particular favorite channel. When the user desires to watch a particular program, the user may select the window in the mosaic view that is showing the particular program. In response to selection of the window, the content of the particular program may be enlarged to a larger window that is easier to see. In a particular embodiment, the user may select a restart button to restart the particular program, i.e., replay the displayed program in the selected window from the beginning. In response to selection of the restart button, the particular program may be shown from the beginning of the program in an enlarged view, (e.g., a full screen view), using content from the automatically recorded program.

In another embodiment, a restart button can be displayed for each window in the mosaic view, enabling the user to select the restart button of the window showing the desired program. In response to selecting the restart button for a particular window, the program shown in the window may be restarted from the beginning of the program, using the content from the automatically recorded program. In another embodiment, the program shown by the window may be both restarted and enlarged in response to a selection of the restart button.

Figure 2:
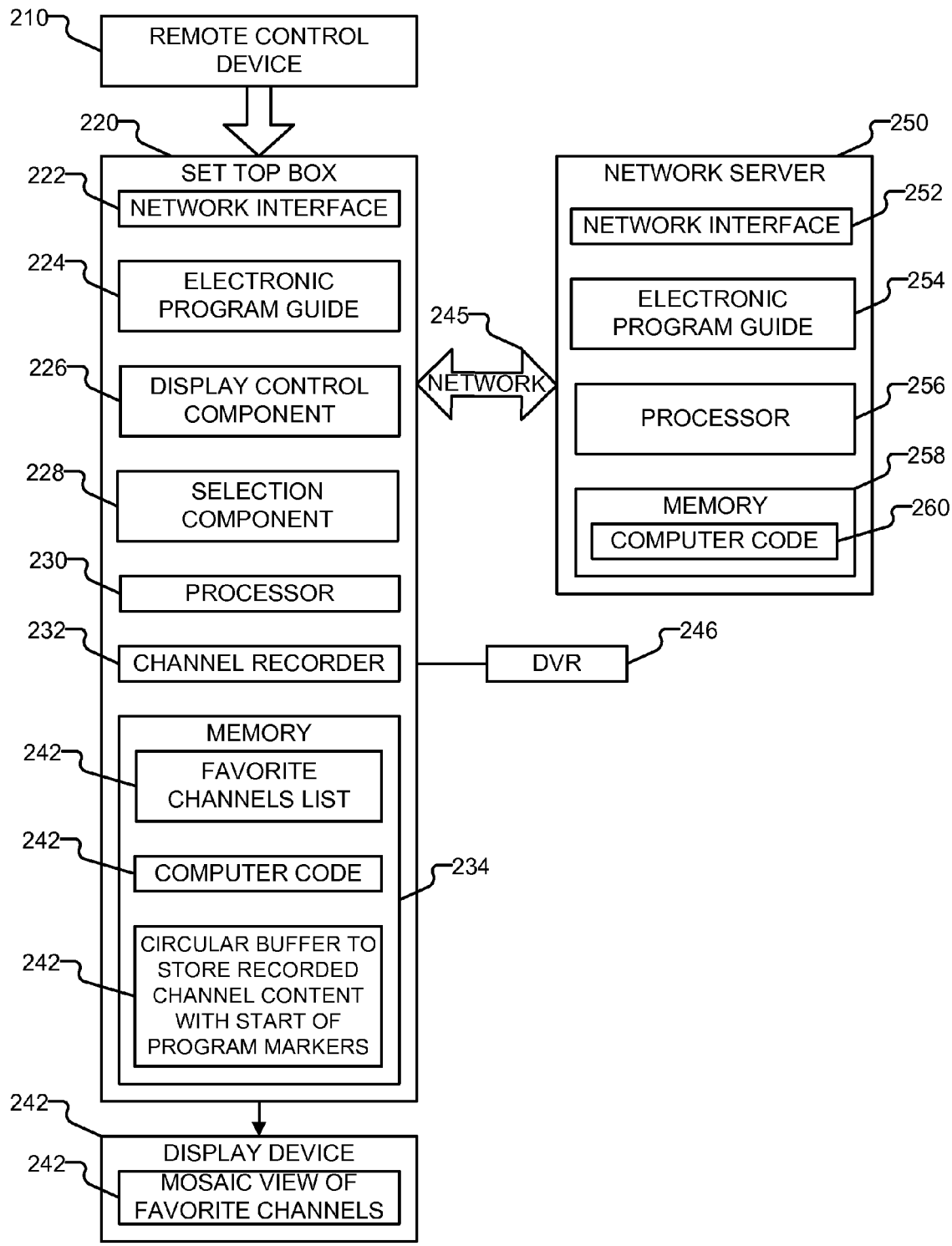
FIG. 2 is a block diagram of a second illustrative embodiment of a system to record programs of favorite channels.

FIG. 2 is a block diagram of a second illustrative embodiment of a system to record programs of multiple channels. In a particular embodiment, recording of programs on channels of a favorite channels list 236 occurs at a set top box 220. Accordingly, the set top box 220 may include a channel recorder 232 and a circular buffer 240 in a memory 234 to store recorded content of the programs of the favorite channels list 236. Recording may be for a fixed or variable amount of time. For example, in a particular embodiment, the circular buffer 240 may store the most recently recorded four hours of program content. In another embodiment, the circular buffer 240 may store a most recent two hours of program content. In another embodiment, the circular buffer may store a predetermined number of most recent programs, based on information from an electronic program guide 224.

The set top box 220 may include a network interface 222 to enable communications between the set top box 220 and a network server 250 via a network 245. The electronic program guide 224, that may be downloaded from the network server 250, may provide program start information, durations of programs, the titles of programs, actors appearing in programs, brief descriptions of programs, other information associated with programs, or any combination thereof A user may view a display of electronic program guide information from the electronic program guide 224 by selecting a key on a remote control device 210. In some embodiments, the display of the electronic program guide information is interactive, allowing the user to scroll over channels (vertical scroll) or over time slots (horizontal scroll).

The set top box 220 may include a display control component 226 to communicate a display interface that includes a plurality of windows to a display device 242 to display a mosaic view of favorite channels 244. In a particular embodiment, a first window of the plurality of windows is designated to display content of a first favorite channel and a second window of the plurality of windows is designated to display content of a second favorite channel. In addition, more than two windows can be displayed to display content of more than two favorite channels. For example, a user may have three or more favorite channels with a window for each favorite channel.

The set top box 220 may include a selection component 228 to produce a selectable control element for display at the display device 242. When the selectable control element is selected, a program in progress may be displayed from the beginning of the program. The program may be retrieved from content stored in the circular buffer 240. For example, the selectable control element may include a button labeled "RESTART." The user may select the "RESTART" button using one or more of the keys of the remote control device 210.

In one embodiment, the set top box 220 includes a processor 230. The processor 230 may execute computer code 238 stored in the memory 234. Execution of the computer code 238 may cause the set top box 220 to perform various functions. For example, these functions may include displaying a plurality of windows at the display device 242, where a first window shows a first program of a first channel and a second window shows a second program of a second channel. The functions may also include displaying a start of program option that, when selected, causes the display device 242 to display a program in progress starting from the beginning of the program. The functions may also include displaying a selected program in an enlarged view.

In a particular embodiment, the channel recorder 232 of the set top box 220 automatically records programs of multiple channels (e.g., channels in a favorite channels list or in channels in a mosaic view). In some embodiments, the channel recorder 232 is coupled to a Digital Video Recorder (DVR) 246 that is separate from, but accessible to, the set top box 220.

The network server 250 may include a network interface 252 that enables communication between the network server 250 and the set top box 220 via the network 245. The network server 250 may include an electronic program guide (EPG) 254 that may be downloaded to the set top box 220. The network server 250 may include a processor 256 that executes computer code 262 stored in a memory 258. Execution of the computer code 262 may cause the EPG 254 to be downloaded to the set top box 220.

Figure 3:
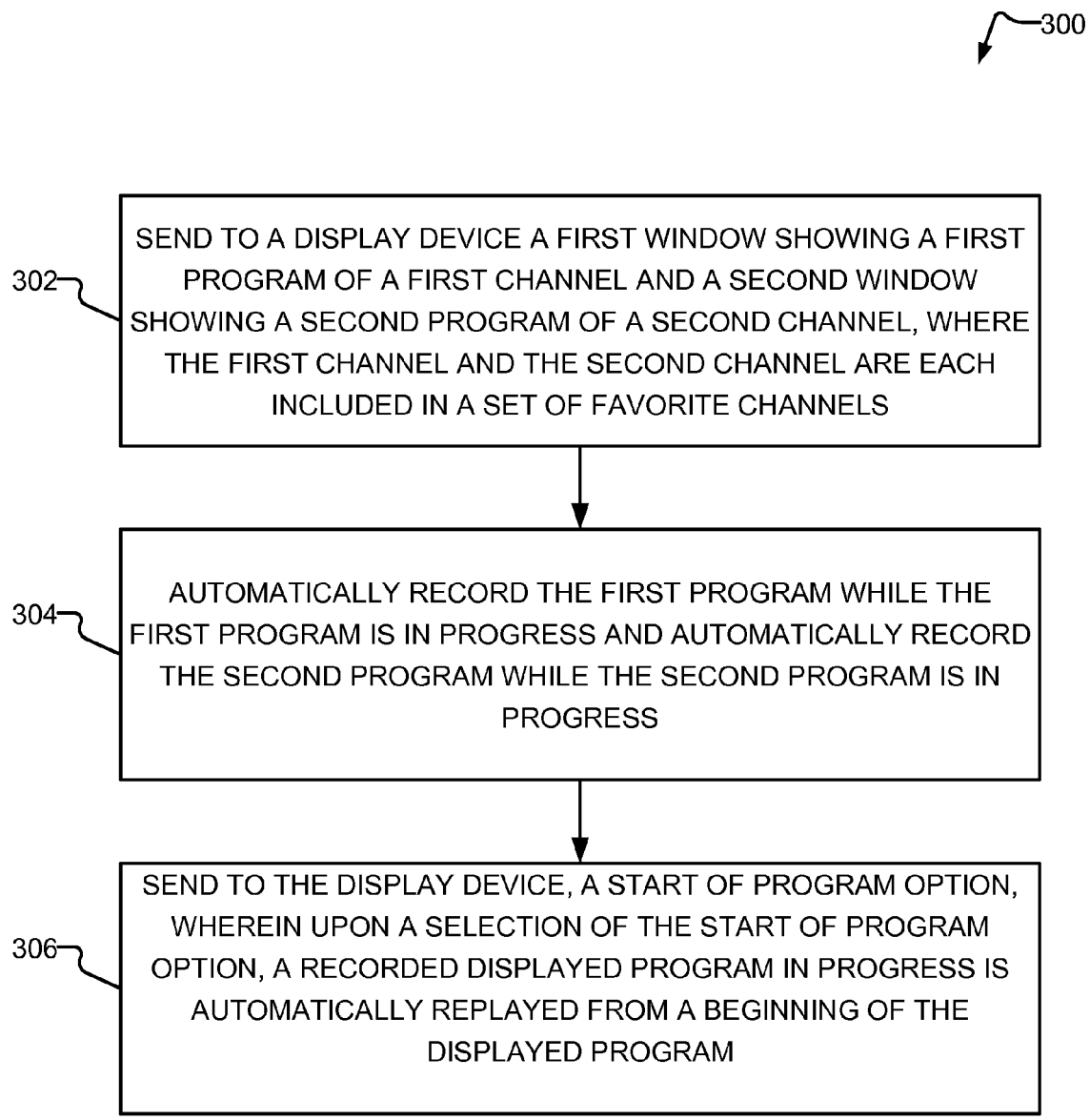
FIG. 3 is a flowchart of a first embodiment of a method of recording programs of favorite channels.

FIG. 3 is a flowchart of a first embodiment of a method 300 of recording programs of displayed channels. In a particular embodiment, the method 300 of FIG. 3 may be performed by a system including a set top box and a network server, such as the system illustrated in FIG. 1 or the system illustrated in FIG. 2. Starting at 302, a first program of a first channel is displayed in a first window at a display device and a second program of a second channel is displayed in a second window at the display device. The first and second channels are included in a set of favorite channels or are displayed in a mosaic view. The set of favorite channels may be input by a user or may be determined by observation of a user's viewing patterns. For example, three channels viewed most by the user may be automatically selected by a set top box as the user's favorite channels. Moreover, one list of favorite channels may be stored for one user, such as a parent, and another list of favorite channels may be stored for a second user, such as a child. The content of the favorite channels may be displayed in a mosaic view, (e.g., a plurality of small windows), by selecting a key on a remote control device. Thus, referring to FIG. 1, for example, a selection from the remote control device 110 to present favorite channels is received by the set top box 120. In response to the selection, the display control component 126 causes a mosaic view of favorite channels 142 to be displayed on the display device 140.

Advancing to 304, the first program is automatically recorded while the first program is in progress. The second program is automatically recorded while the second program is in progress. The recording of the first and second programs is performed automatically without any action required by a user. The first and second programs can be recorded concurrently. The recording may not be limited to two programs. For example, the user may have three favorite channels that can be simultaneously displayed in a mosaic view by a display device. These three channels may be recorded concurrently by a network server or a set top box. Further, the recording of programs of favorite channels may occur automatically while the programs are in progress, even if the programs are not being displayed in a mosaic view. For example, all the programs of each favorite channel may be recorded in a circular buffer, whether the viewer is viewing the programs or not.

In one embodiment, a list of the user's favorite channels is uploaded to a network server from a set top box, and the network server automatically records the content of the favorite channels during transmission of these channels to the set top box. Because the favorite channels are being recorded automatically while in progress, the user need not initiate or schedule a recording. When the user desires to watch a particular program of one of the user's favorite channels from the beginning of the program, the program can be restarted immediately because the program has previously been recorded. This is convenient to the user since the user does not have to initiate or schedule a recording of the program the user wants to see from the beginning.

Moving to 306, a start of program option is sent to the display device. When the start of program option is selected by the user, a recorded version of the displayed program in progress is automatically replayed from a beginning of the program in progress. In one embodiment, when the plurality of windows showing content of favorite channels is displayed, the user can select a window showing a particular program the user desires to view from the beginning. In response to selection of the window, the recorded program being shown by that window may be displayed in an enlarged view. In one embodiment, the enlarged view is displayed along with a restart button that may be selected by the user. When the user selects the restart button, the program, which had been displayed in progress, is displayed starting from the beginning of the program, using the content of the automatically recorded program (such as a program that is recorded at a set top box, a DVR coupled to the set top box, or at a server).

Since recording of programs of favorite channels occurs automatically in the method 300 of FIG. 3, the user does not have to initiate or schedule a recording of a program of a favorite channel. A start of program marker can be inserted into the recordings of multiple programs based on information from an electronic program guide. When a user selects to start the program from the beginning, the program can start from the beginning of the program immediately because the program has already been recorded and the start of program marker shows the location in the recording where the program begins.

Figure 4:
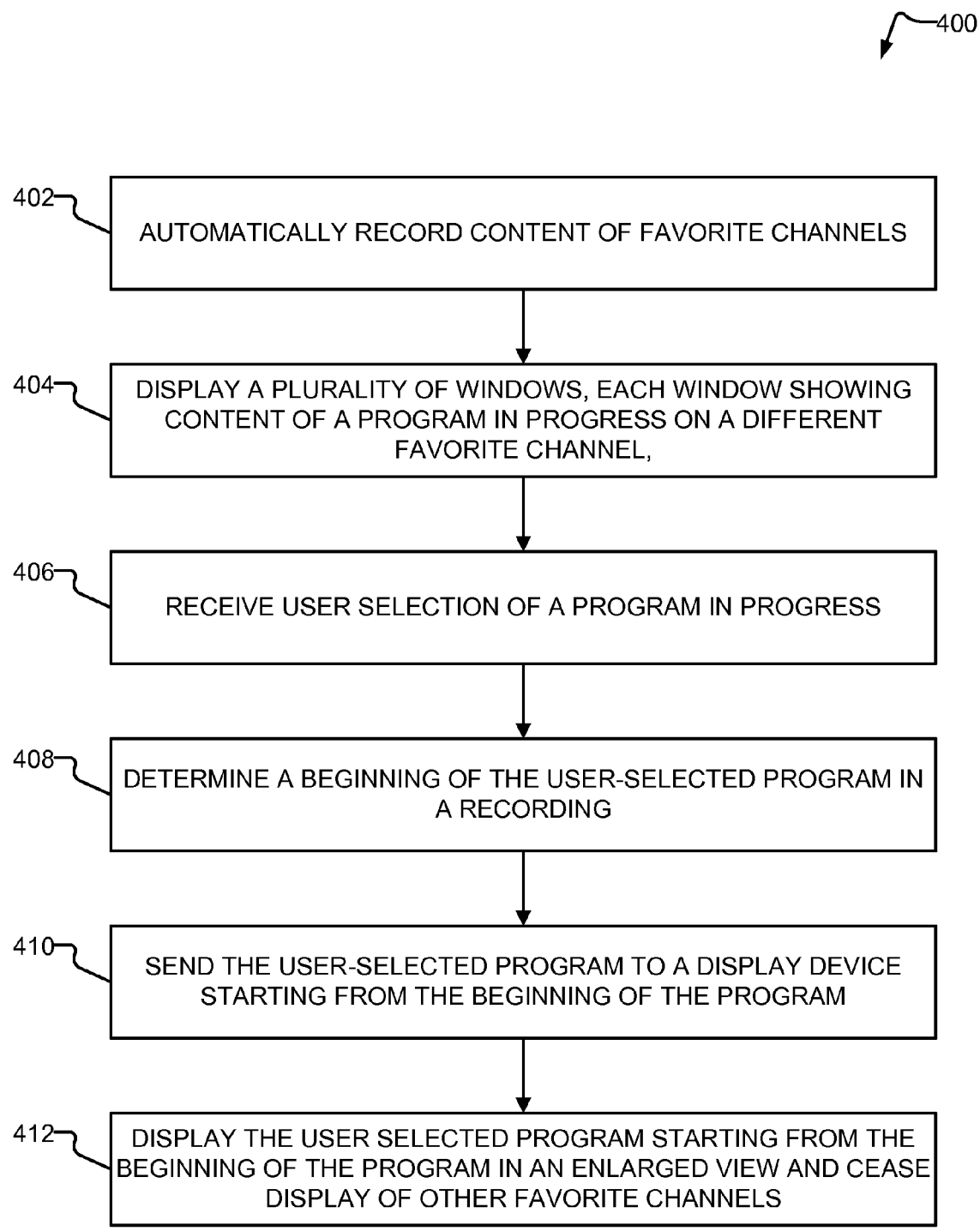
FIG. 4 is a flowchart of a second embodiment of a method of recording programs of favorite channels.

FIG. 4 is a flowchart of a second embodiment of a method 400 of recording programs of multiple channels. In a particular embodiment, the method of FIG. 4 may be performed by a system including a set top box and a network server, such as the system illustrated in FIG. 1 or the system illustrated in FIG. 2. At 402, content of multiple channels is automatically recorded. A recording component automatically records content during a recording buffer time period. Recording may be for a fixed or variable amount of time. For example, in a particular embodiment, the circular buffer 240 may store the most recently recorded four hours of program content. In another embodiment, the circular buffer 240 may store two hours of program content. In another embodiment, the circular buffer may store a predetermined number of programs. In various embodiments, recording may occur in the network server 150 of FIG. 1, in the set top box 220 of FIG. 2, or in a separate attached DVR, such as the DVR 246 of FIG. 2.

Advancing to 404, a plurality of windows is displayed at a display device. Each of the windows may show content of a program in progress on a different channel. For example, a user may be viewing a mosaic view of favorite channels. In a particular embodiment, the method may enable the user to display a program in progress on a channel from the beginning of the program. To illustrate, the user may decide to watch a movie that is being displayed in progress in a window of the mosaic view. To do so, the user may select the movie by using a remote control device. For example, the user may depress arrow keys to select the window displaying the movie. Therefore, at 406, user selection of a program in progress may be received during display of the window that shows content of programs is progress. In response to the user selection, the selected window may be enlarged and the other windows may cease to be displayed.

Continuing at 408, the beginning of the user selected program in a recording of the selected program is determined. For example, the automatic recording of the program in progress in the selected window may be searched until a start of program marker is found. The start of program marker may be inserted into the recording of the program based on data of an electronic program guide. When the start of program marker is found, content of the program is sent to a display device starting from the beginning of the program, at 410. Moving to 412, the display device displays the user-selected program starting from the beginning. In a particular embodiment, the displayed program is displayed in an enlarged view. When the displayed program is played back from the beginning of the program, the windows of the other favorite channels may cease to be displayed. Alternatively, the other windows may have been removed and the program in progress may be displayed in a large window or full screen view prior to user selection of the start from beginning option.

Figure 5:
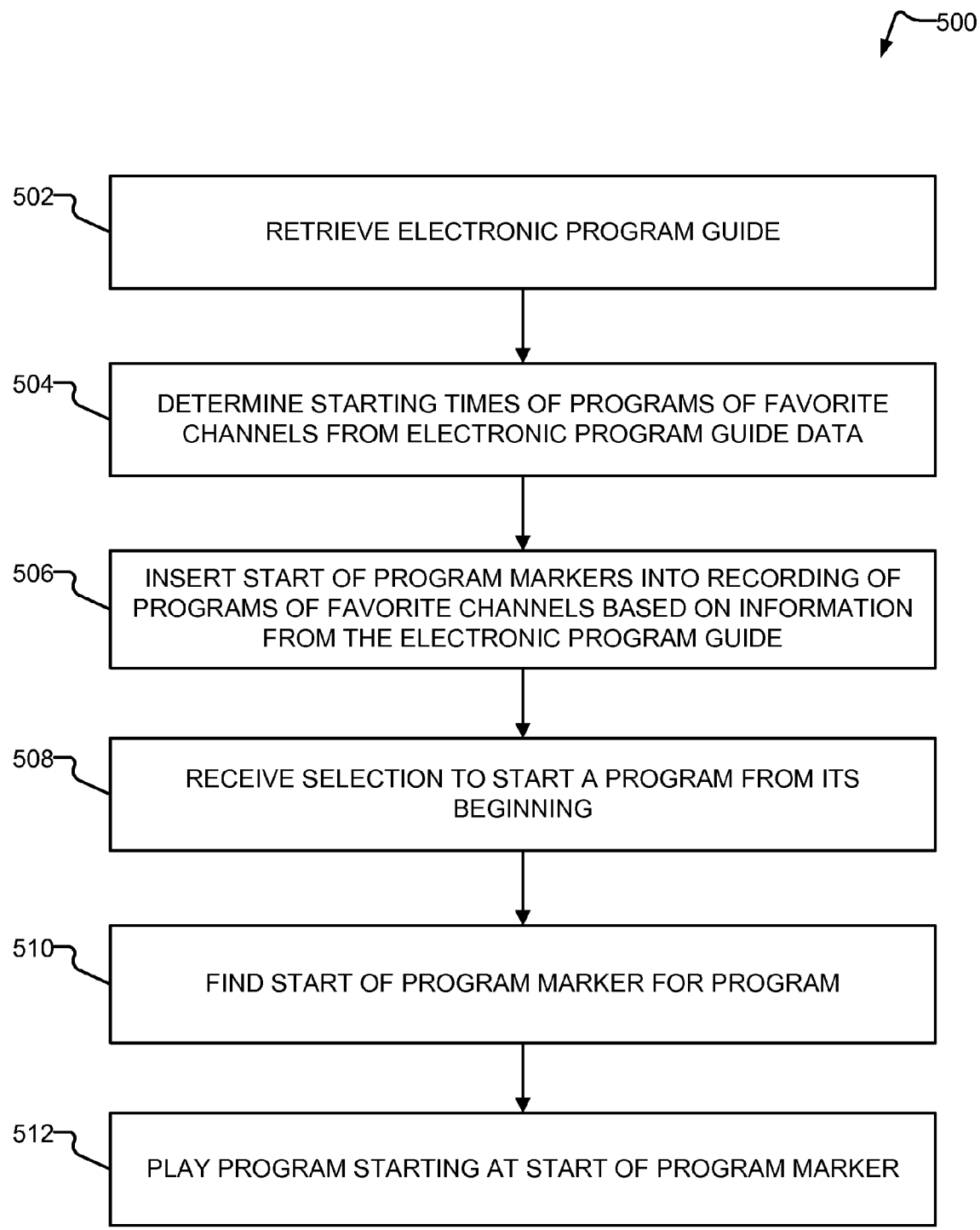
FIG. 5 is a flowchart of a third embodiment of a method of recording programs of favorite channels.

FIG. 5 is a flowchart of a third embodiment of a method 500 of recording programs of multiple channels. In a particular embodiment, the method of FIG. 5 may be performed by a system including a set top box and a network server, such as the system illustrated in FIG. 1 or the system illustrated in FIG. 2. At 502, an electronic program guide is retrieved. Continuing at 504, the times at which programs start is determined from the electronic program guide. Advancing to 506, as content of a channel is recorded, start of program markers are inserted into the recording of each program for each channel at the time a program begins, based on information from the electronic program guide. At 508, a selection of a program to be started at the beginning is received. Moving to 510, in response to the selection, the recording is searched for the start of program marker. Advancing to 512, the program is started from the location of the start of program marker. For example, referring to FIG. 1, the electronic program guide 154 provides start times of programs to be inserted into recordings of the programs recorded by the channel recorder 156. When selection of a program to be started from the beginning is received by the network server 150, the network server 150 sends the recorded program to the set top box 120.

Figure 6:
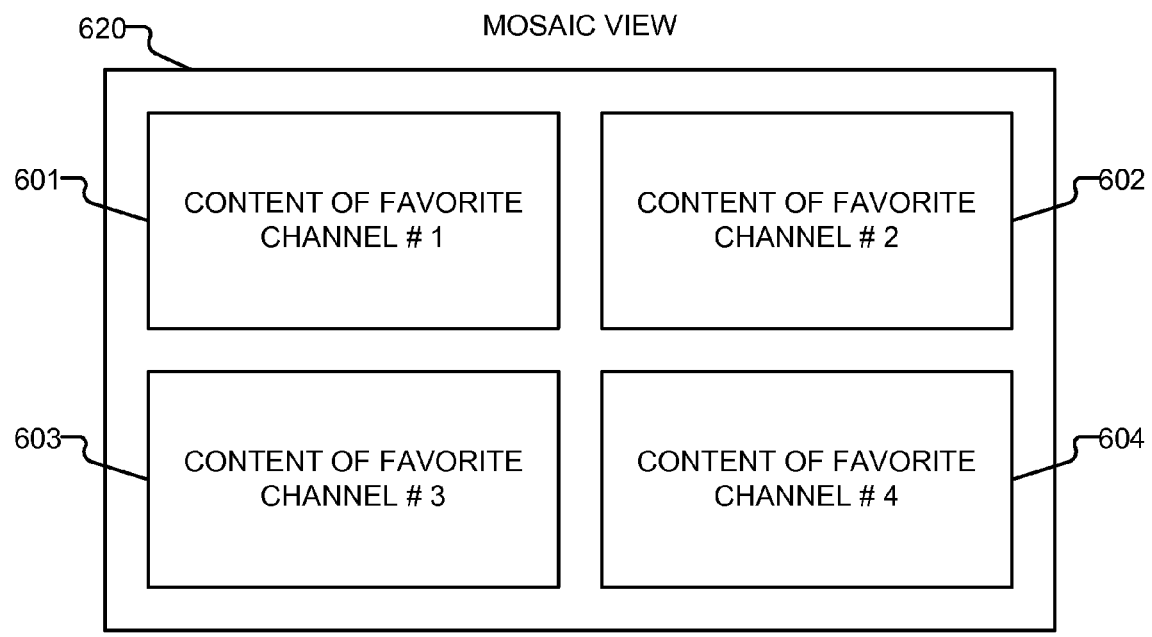
FIG. 6 is a display of a first embodiment of a graphical user interface of a system to record programs of favorite channels.

FIG. 6 is a display of an embodiment of a graphical user interface of a system to record programs of multiple channels. The graphical user interface of FIG. 6 may be displayed by a display device, such as the display device 140 of FIG. 1 or the display device 242 of FIG. 2. The display 620 illustrates a particular embodiment of a mosaic view. In FIG. 6, four windows 601-604 are shown within the display 620. Each of the windows 601-604 shows a program in progress on a different channel. In various embodiments, more or fewer than four windows can be displayed. For example, a user may have only three favorite channels so that only three windows are displayed.

Figure 7:
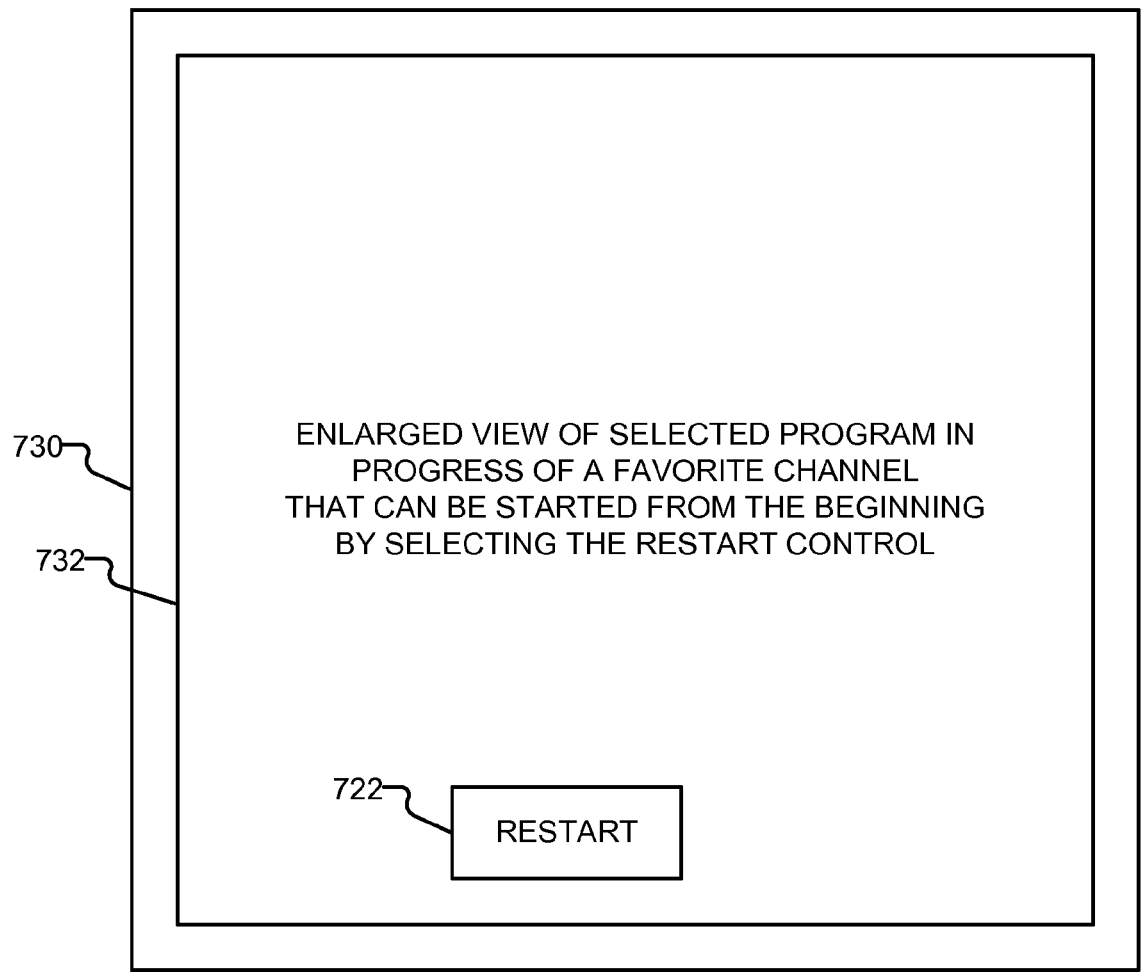
FIG. 7 is a display of a second embodiment of a graphical user interface of a system to record programs of favorite channels.

When the plurality of windows 601-604 are displayed, the user may select one of the displayed windows 601-604. In response to selection of a displayed window 601, the program being shown by the selected window 601 may be displayed in an enlarged view 732 of the display 730, as illustrated in FIG. 7. In some embodiments, a restart control element 722 is displayed. The user may select the restart control element 722 by depressing one or more keys on a remote control device. In response to selection of the restart control element 722, the selected program being displayed in progress in the enlarged view 732 may be started from the beginning of the program using an automatic recording of the program. The enlarged view may occupy an entire screen of the display device. In some embodiments, when the selected program is enlarged, other windows 602-604 are not visible.

Figure 8:
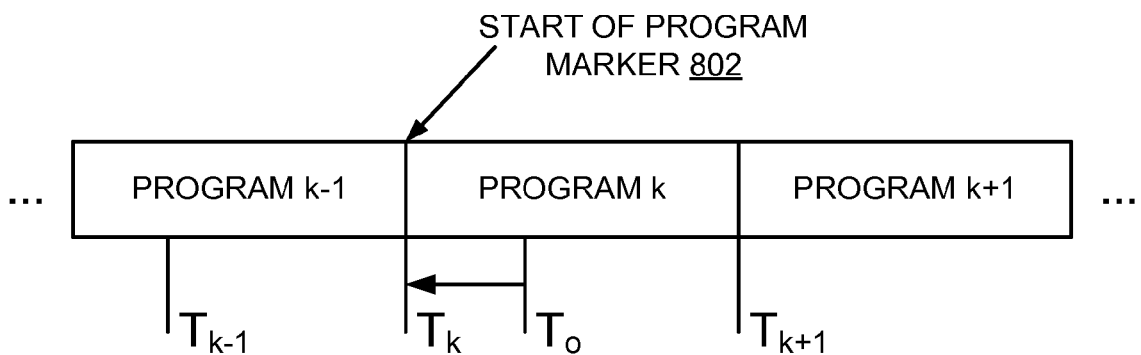
FIG. 8 is a timing diagram to illustate a sequence of programs of favorite channels being recorded.

FIG. 8 is a timing diagram showing a sequence of programs of channels being recorded. In a particular embodiment, the timing of FIG. 8 may be performed by a network server, such as the network server 150 of FIG. 1, or by a set top box, such as the set top box 220 of FIG. 2. At time $T_{k-1}$, a program k-1 begins, followed by a next program k, that begins at time $T_k$. At time $T_k$, a start of program marker 802 is inserted in a recording of the program k at the beginning of the program k. FIG. 8 also shows another program k+1 to be recorded after program k. Program k+1 starts at time $T_{k+1}$. Start of program markers can be inserted at times $T_{k-1}$, $T_k$, and $T_{k+1}$, to indicate a beginning of each of the programs k-1, k, and k+1, respectively.

At the time $T_o$, a user may select to restart a selected program from the beginning. In one embodiment, in response to receiving the user selection, a recording of the program may be searched, starting at time $T_o$, and moving backward through the recording until the start of program marker 802 is found. In another embodiment, a start of program marker is an address of a memory location where a stored program starts. In such an embodiment, when the restart selection is received, the address of the start of program marker 802 may be retrieved to determine the memory location where the stored content of the program begins. The recording of the program can then be replayed starting from the beginning of the program. Meanwhile, the recording of the program at time $T_o$ and thereafter continues.

Figure 9:
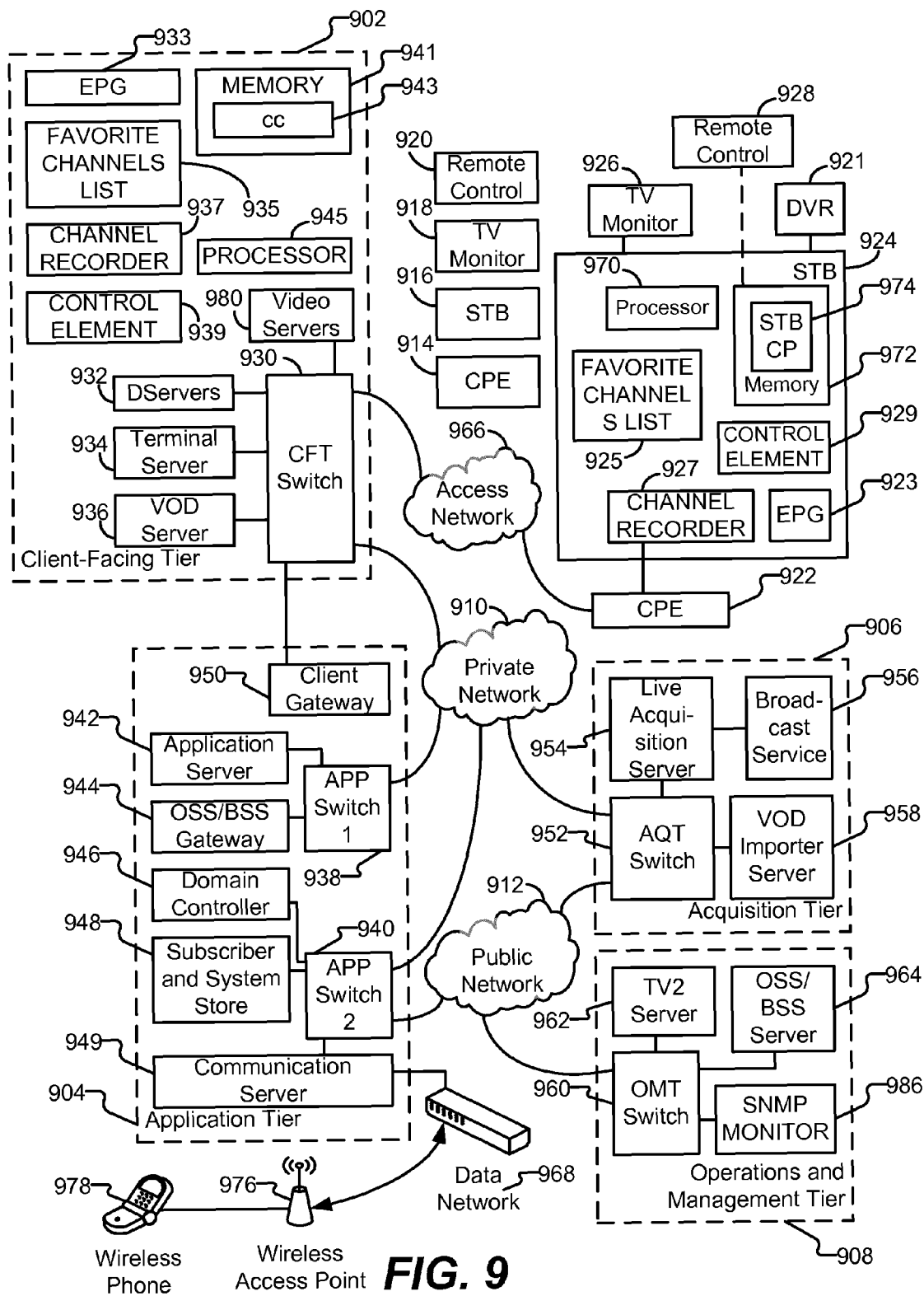
FIG. 9 is a block diagram illustrating a particular illustrative embodiment of a system to record programs of favorite channels.

FIG. 9 is a block diagram illustrating a particular illustrative embodiment of a system to record programs of multiple channels. An Internet Protocol Television (IPTV) system that may be used to provide automatic recording of channels and to replay a selected program from the start of a selected program is illustrated and generally designated at 900. As shown, the system 900 can include a client facing tier 902, an application tier 904, an acquisition tier 906, and an operations and management tier 908. Each tier 902, 904, 906, 908 is coupled to a private network 910, to a public network 912, such as the Internet, or to both the private network 910 and the public network 912. For example, the client-facing tier 902 can be coupled to the private network 910. Further, the application tier 904 can be coupled to the private network 910 and to the public network 912. The acquisition tier 906 can also be coupled to the private network 910 and to the public network 912. Additionally, the operations and management tier 908 can be coupled to the public network 912.

As illustrated in FIG. 9, the various tiers 902, 904, 906, 908 communicate with each other via the private network 910 and the public network 912. For instance, the client-facing tier 902 can communicate with the application tier 904 and the acquisition tier 906 via the private network 910. The application tier 904 can communicate with the acquisition tier 906 via the private network 910. Further, the application tier 904 can communicate with the acquisition tier 906 and the operations and management tier 908 via the public network 912. Moreover, the acquisition tier 906 can communicate with the operations and management tier 908 via the public network 912. In a particular embodiment, elements of the application tier 904, including, but not limited to, a client gateway 950, can communicate directly with the client-facing tier 902.

The client-facing tier 902 can communicate with user equipment via an access network 966, such as an Internet Protocol Television (IPTV) access network. In an illustrative embodiment, customer premises equipment (CPE) 914, 922 can be coupled to a local switch, router, or other device of the access network 966. The client-facing tier 902 can communicate with a first representative set-top box device 916 via the first CPE 914 and with a second representative set-top box device 924 via the second CPE 922. In a particular embodiment, the first representative set-top box device 916 and the first CPE 914 can be located at a first customer premise, and the second representative set-top box device 924 and the second CPE 922 can be located at a second customer premise. In another particular embodiment, the first representative set-top box device 916 and the second representative set-top box device 924 can be located at a single customer premise, both coupled to one of the CPE 914, 922.

The CPE 914, 922 can include routers, local area network devices, modems, such as digital subscriber line (DSL) modems, or any other suitable devices for facilitating communication between a set-top box device, the access network 966, or any combination thereof. In an exemplary embodiment, the client-facing tier 902 can be coupled to the CPE 914, 922 via fiber optic cables. In another exemplary embodiment, the CPE 914, 922 can be digital subscriber line (DSL) modems that are coupled to one or more network nodes via twisted pairs, and the client-facing tier 902 can be coupled to the network nodes via fiber-optic cables. Each set-top box device 916, 924 can process data received via the access network 966, via an IPTV software platform, such as Microsoft® TV IPTV Edition.

The first set-top box device 916 can be coupled to a first external display device, such as a first television monitor 918, and the second set-top box device 924 can be coupled to a second external display device, such as a second television monitor 926. Moreover, the first set-top box device 916 can communicate with a first remote control 920, and the second set-top box device 924 can communicate with a second remote control 928. The set-top box devices 916, 924 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 916, 924 can receive data, video, or any combination thereof, from the client-facing tier 902 via the access network 966 and render or display the data, video, or any combination thereof, at the display device 918, 926 to which it is coupled. In an illustrative embodiment, the set-top box devices 916, 924 can include tuners that receive and decode television programming signals or packet streams for transmission to the display devices 918, 926. Further, the set-top box devices 916, 924 can include a STB processor 970 and a STB memory device 972 that is accessible to the STB processor 970. In one embodiment, a computer program, such as the STB computer program 974, can be embedded within the STB memory device 972.

In an illustrative embodiment, the client-facing tier 902 can include a client-facing tier (CFT) switch 930 that manages communication between the client-facing tier 902 and the access network 966 and between the client-facing tier 902 and the private network 910. As illustrated, the CFT switch 930 is coupled to one or more data servers, such as D-servers 932, that store, format, encode, replicate, or otherwise manipulate or prepare video content for communication from the client-facing tier 902 to the set-top box devices 916, 924. The CFT switch 930 can also be coupled to a terminal server 934 that provides terminal devices with a connection point to the private network 910. In a particular embodiment, the CFT switch 930 can be coupled to a video-on-demand (VOD) server 936 that stores or provides VOD content imported by the IPTV system 900. Further, the CFT switch 930 is coupled to one or more video servers 980 that send the video content to the set-top box devices 916, 924 via the access network 966. In a particular embodiment, the CFT switch 930 can be coupled to a video-on-demand (VOD) server 936 that stores or provides VOD content imported by the IPTV system 900. Further, the CFT switch 930 is coupled to one or more multicast video servers 980 that receive video content and multicast the video content to the set-top box devices 916, 924 via the access network 966.

In an illustrative embodiment, the client-facing tier 902 can communicate with a large number of set-top box devices via the access network 966, such as the representative set-top box devices 916, 924, over a wide geographic area, such as a neighborhood area, a metropolitan area, a viewing area, a statewide area, a regional area, a nationwide area or any other suitable geographic area, market area, or subscriber or customer group that can be supported by networking the client-facing tier 902 to numerous set-top box devices. In a particular embodiment, the CFT switch 930, or any portion thereof, can include a multicast router or switch that communicates with multiple set-top box devices via a multicast-enabled network.

As illustrated in FIG. 9, the application tier 904 can communicate with both the private network 910 and the public network 912. The application tier 904 can include a first application tier (APP) switch 938 and a second APP switch 940. In a particular embodiment, the first APP switch 938 can be coupled to the second APP switch 940. The first APP switch 938 can be coupled to an application server 942 and to an operation systems and support (OSS)/billing systems and support (BSS) gateway 944. In a particular embodiment, the application server 942 can provide applications to the set-top box devices 916, 924 via the access network 966, which enable the set-top box devices 916, 924 to provide functions, such as interactive electronic program guides, video gaming, display, messaging, processing of VOD material and other IPTV content, etc. In a particular embodiment, the OSS/BSS gateway 944 includes operation systems and support (OSS) data, as well as billing systems and support (BSS) data. In one embodiment, the OSS/BSS gateway 944 can provide or restrict access to an OSS/BSS server 964 that stores operations and billing systems data.

The second APP switch 940 can be coupled to a domain controller 946 that provides Internet access, for example, to users at their computers via the public network 912. For example, the domain controller 946 can provide remote Internet access to IPTV account information, e-mail, personalized Internet services, or other online services via the public network 912. In addition, the second APP switch 940 can be coupled to a subscriber and system store 948 that includes account information, such as account information that is associated with users who access the IPTV system 900 via the private network 910 or the public network 912. In an illustrative embodiment, the subscriber and system store 948 can store subscriber or customer data and create subscriber or customer profiles that are associated with IP addresses, stock-keeping unit (SKU) numbers, other identifiers, or any combination thereof, of corresponding set-top box devices 916, 924. Further, the second APP switch 940 can be coupled to a communication server 949 that communicates with a wireless phone 978 via a data network 968 and a wireless access point 976.

In a particular embodiment, the application tier 904 can include a client gateway 950 that communicates data directly to the client-facing tier 902. In this embodiment, the client gateway 950 can be coupled directly to the CFT switch 930. The client gateway 950 can provide user access to the private network 910 and the tiers coupled thereto. In an illustrative embodiment, the set-top box devices 916, 924, or other devices coupled to the CPE 914, 922, can access the IPTV system 900 via the access network 966, using information received from the client gateway 950. User devices can access the client gateway 950 via the access network 966, and the client gateway 950 can allow such devices to access the private network 910 once the devices are authenticated or verified. Similarly, the client gateway 950 can prevent unauthorized devices, such as hacker computers or stolen set-top box devices from accessing the private network 910, by denying access to these devices beyond the access network 966.

For example, when the first representative set-top box device 916 accesses the client-facing tier 902 via the access network 966, the client gateway 950 can verify subscriber information by communicating with the subscriber and system store 948 via the private network 910. Further, the client gateway 950 can verify billing information and status by communicating with the OSS/BSS gateway 944 via the private network 910. In one embodiment, the OSS/BSS gateway 944 can transmit a query via the public network 912 to the OSS/BSS server 964. After the client gateway 950 confirms subscriber and/or billing information, the client gateway 950 can allow the set-top box device 916 to access IPTV content and VOD content at the client-facing tier 902. If the client gateway 950 cannot verify subscriber information for the set-top box device 916, e.g., because it is connected to an unauthorized twisted pair, the client gateway 950 can block transmissions to and from the set-top box device 916 beyond the access network 966.

As indicated in FIG. 9, the acquisition tier 906 includes an acquisition tier (AQT) switch 952 that communicates with the private network 910. The AQT switch 952 can also communicate with the operations and management tier 908 via the public network 912. In a particular embodiment, the AQT switch 952 can be coupled to a live acquisition server 954 that receives or acquires television content, movie content, advertisement content, other video content, or any combination thereof, from a broadcast service 956, such as a satellite acquisition system or satellite head-end office. In a particular embodiment, the live acquisition server 954 can transmit content to the AQT switch 952, and the AQT switch 952 can transmit the content to the CFT switch 930 via the private network 910.

In an illustrative embodiment, content can be transmitted to the D-servers 932, where it can be encoded, formatted, stored, replicated, or otherwise manipulated and prepared for communication from the video server(s) 980 to the set-top box devices 916, 924. The CFT switch 930 can receive content from the video server(s) 980 and communicate the content to the CPE 914, 922 via the access network 966. The set-top box devices 916, 924 can receive the content via the CPE 914, 922, and can transmit the content to the television monitors 918, 926. In an illustrative embodiment, video or audio portions of the content can be streamed to the set-top box devices 916, 924.

The client facing tier 902 may deliver channels of programs through CFT switch 930. An electronic program guide (EPG) 933 of client facing tier 902 can be downloaded to a plurality of set top boxes 916, 924. For example, an EPG 923 stored at the set top box 924 may be downloaded from the client facing tier 902. The set top box 924 may transmit to the client facing tier the list of favorite channels 935, which may be stored at the client facing tier 902 as a favorite channels list 935. Additionally, the set top box 924 may store a list of favorite channels 925.

In some embodiments, the client facing tier includes a channel recorder 937 to record the content of programs of favorite channels. The recorded content of programs of favorite channels may be stored in a memory 941. Start of program markers can also be inserted into the recorded content of programs at the start of the programs. The position in the recording where the start of program marker is inserted may be determined from a starting time provided by the EPG 933. In other embodiments, the set top box 924 has a channel recorder 927 to record content of programs of favorite channels. The position in a recording where a start of program marker is to be inserted may be determined from the EPG 923. In some embodiments, rather than insert a start of program marker into the recording, the address of the memory location where the program starts is tracked. Then, when a program is selected, the starting address of the selected program may be retrieved to locate the position in memory where the selected program starts.

In some embodiments, the client facing tier 902 provides a control element 939 that is inserted into a video stream to be displayed at the TV monitor 918, 926. When the user selects the displayed control element, a selected program may be played from the beginning of the program. In other embodiments, the set top box 924, 916 may include the control element 929 that is displayed at the TV monitor 918, 926.

Thus, in one embodiment the recording of favorite channels occurs automatically in the client facing tier 902 and in another embodiment the recording of favorite channels occurs automatically at the set top box 916, 924 or in a DVR 921 connected to the set top box 924.

The AQT switch 952 can be coupled to a video-on-demand importer server 958 that receives and stores television or movie content received at the acquisition tier 906 and communicates the stored content to the VOD server 936 at the client-facing tier 902 via the private network 910. Additionally, at the acquisition tier 906, the video-on-demand (VOD) importer server 958 can receive content from one or more VOD sources outside the IPTV system 900, such as movie studios and programmers of non-live content. The VOD importer server 958 can transmit the VOD content to the AQT switch 952, and the AQT switch 952, in turn, can communicate the material to the CFT switch 930 via the private network 910. The VOD content can be stored at one or more servers, such as the VOD server 936.

When users issue requests for VOD content via the set-top box devices 916, 924, the requests can be transmitted over the access network 966 to the VOD server 936, via the CFT switch 930. Upon receiving such requests, the VOD server 936 can retrieve the requested VOD content and transmit the content to the set-top box devices 916, 924 across the access network 966, via the CFT switch 930. The set-top box devices 916, 924 can transmit the VOD content to the television monitors 918, 926. In an illustrative embodiment, video or audio portions of VOD content can be streamed to the set-top box devices 916, 924.

FIG. 9 further illustrates that the operations and management tier 908 can include an operations and management tier (OMT) switch 960 that conducts communication between the operations and management tier 908 and the public network 912. In the embodiment illustrated by FIG. 9, the OMT switch 960 is coupled to a TV2 server 962. Additionally, the OMT switch 960 can be coupled to an OSS/BSS server 964 and to a simple network management protocol (SNMP) monitor 986 that monitors network devices within or coupled to the IPTV system 900. In a particular embodiment, the OMT switch 960 can communicate with the AQT switch 952 via the public network 912.

In an illustrative embodiment, the live acquisition server 954 can transmit content to the AQT switch 952, and the AQT switch 952, in turn, can transmit the content to the OMT switch 960 via the public network 912. In this embodiment, the OMT switch 960 can transmit the content to the TV2 server 962 for display to users accessing the user interface at the TV2 server 962.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executed by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium such as the memory 972 that includes instructions such as the set top box computer program 974 to cause the processor 970 to perform various functions. These functions may include presenting content of a first program of a first channel for display at a first window at a display device and presenting content of a second program of a second channel for display at a second window at the display device. The functions may also include automatically recording the first program and the second program while the first and second programs are in progress. The functions may also include presenting for display a start of program option, where selection of the start of program option causes a recording of a particular program in progress to be displayed from a beginning of the particular program in progress. In an alternative embodiment, these functions may be performed by a processor 945 according to computer instructions 943 stored in the computer-readable memory 941 of the client facing tier 902.

In some embodiments, therefore, the computer readable storage medium includes instructions to cause the processor (e.g., processor 945 or 970) to automatically store a recording of each of two or more channels without receiving a selection to record the programs from a user. The computer readable storage medium may also include instructions to cause the processor 945, 970 to automatically store a recording of each of the first and second programs in a memory, e.g., memory 941, 970. The computer readable storage medium may further include instructions to cause the processor 945, 970 to retrieve program content from a storage location that is remote from the display device 918, 926. The computer readable storage medium may also include instructions to cause the processor 945, 970 to display a selected program from a beginning of the selected program. Instructions included in the computer readable storage medium may further cause the processor 945, 970 to access an electronic program guide to determine a beginning time of a selected program. Instructions may further cause the processor 945, 970 to cause a selected program to be displayed in an enlarged window. Instructions may also cause the processor 945, 970 to cease display of an unselected program when a particular program in progress begins to be replayed from the beginning. Some or all of these functions may be performed at a set top box or at a network server or both.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium can include a solid-state memory such as a memory card or other package that houses one or more non-volatile read-only memories. Further, the computer-readable medium can be a random access memory (RAM) or other volatile re-writable memory. Additionally, the computer-readable storage medium can include a magneto-optical or optical medium, such as a disk or tapes or other storage device.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk;

or a solid state medium, such as a memory card or other package that houses one or more read-only (non-volatile) memories, random access memories, or other re-writable (volatile) memories. Accordingly, the disclosure is considered to include a tangible storage medium as listed herein and other equivalents and successor media, in which the software implementations herein may be stored.

Although the present specification describes components and functions that may be implemented in particular embodiments with reference to particular standards and protocols, embodiments are not limited to such standards and protocols. For example, standards for television (e.g., NTSC, ATSC), the Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the scope of the claims.

What is claimed is:

1. A method comprising:
sending a plurality of windows to a display device, wherein a first window of the plurality of windows is designated to display a first set of programs associated with a first favorite channel of a set of favorite channels and a second window of the plurality of windows is designated to display a second set of programs associated with a second favorite channel of the set of favorite channels;
automatically recording each of the first set of programs and automatically recording each of the second set of programs, wherein a recording entry is created for each recorded program of automatically recorded programs associated with the set of favorite channels, wherein each recording entry includes a begin program marker that identifies a particular recorded program associated with a particular favorite channel of the set of favorite channels, wherein the begin program marker indicates a starting position of the particular recorded program and an address of a storage location corresponding to the particular recorded program, and wherein the starting position corresponds to a start time of the particular recorded program identified from an electronic programming guide;
and in response to a request to start the particular recorded program of the automatically recorded programs associated with the set of favorite channels at one of the first window and the second window, automatically playing the particular recorded program from the begin program marker, wherein the particular recorded program is played in a particular window of the plurality of windows.

2. The method of claim 1, wherein at least one of the first set of programs and at least one of the second set of programs are recorded concurrently.

3. The method of claim 1, wherein the particular recorded program is a recording of a program that is in progress and is being displayed in the particular window.

4. The method of claim 3, wherein selection of the particular window results in an enlargement of the particular window to a larger size window, and wherein the particular recorded program is displayed in the larger size window.

5. The method of claim 1, wherein the set of favorite channels is determined based on information associated with a viewing behavior of a user.

6. The method of claim 1, wherein the electronic programming guide is received from a network server.

7. The method of claim 1, wherein information identifying the set of favorite channels is stored at a network server.

8. The method of claim 1, wherein information identifying the set of favorite channels is stored at a set top box.

9. The method of claim 1, wherein the automatically recorded programs are recorded at a location remote from the display device.

10. The method of claim 9, wherein the location remote from the display device is a digital video recorder.

11. A system comprising
a display control component to communicate a plurality of windows to a display device, wherein a first window of the plurality of windows is designated to display a first set of programs associated with a first favorite channel of a set of favorite channels and a second window of the plurality of windows is designated to display a second set of programs associated with a second favorite channel of the set of favorite channels;
a network server to automatically record each of the first set of programs and to automatically record each of the second set of programs, wherein a recording entry is created for each recorded program of automatically recorded programs associated with the set of favorite channels, wherein each recording entry includes a begin program marker that identifies a particular recorded program associated with a particular favorite channel of the set of favorite channels, wherein the begin program marker indicates a starting position of the particular recorded program and an address of a storage location corresponding to the particular recorded program, and wherein the starting position corresponds to a start time of the particular recorded program identified from an electronic programming guide;
and a selection component: to receive a selection of a start of program option associated with the particular recorded program associated with a particular favorite channel of the set of favorite channels; and to automatically play the particular recorded program from the begin program marker of a particular recording entry corresponding to the particular recorded program in response to receiving the selection of the start of program option associated with the particular recorded program.

12. The system of claim 11, wherein the network server receives information identifying the set of favorite channels from a set top box.

13. The system of claim 11, wherein the automatically recorded programs are recorded during a recording buffer time period.

14. The system of claim 11, wherein the selection component is associated with a set top box.

15. The system of claim 14, wherein the network server sends the particular recorded program to the set top box to be played.

16. A computer-readable storage memory device including instructions that, when executed by a processor, cause the processor to execute a method comprising:
presenting content of a first set of programs associated with a first favorite channel of a set of favorite channels for display at a first window at a display device;

presenting content of a second set of programs associated with a second favorite channel of the set of favorite channels for display at a second window at the display device;

initiating automatic recording of each of the first set of programs and automatic recording of each of the second set of programs while each of the first set of programs and each of the second set of programs are in progress, wherein a recording entry is created for each recorded program of automatically recorded programs associated with the set of favorite channels, wherein each recording entry includes a begin program marker that identifies a particular recorded program associated with a particular favorite channel of the set of favorite channels, wherein the begin program marker indicates a starting position of the particular recorded program and an address of a storage location corresponding to the particular recorded program, and wherein the starting position corresponds to a start time of the particular recorded program identified from an electronic programming guide;

and presenting for display a control element, wherein selection of the control element causes the particular recorded program associated with a particular favorite channel of the set of favorite channels and corresponding to a particular program in progress in one of the first window and the second window to be automatically played from the begin program marker of a particular recording entry corresponding to the particular recorded program.

17. The computer-readable storage memory device of claim 16,
wherein information identifying the set of favorite channels is stored at a set top box associated with the display device.

18. The computer-readable storage memory device of claim 16,
wherein the storage location is remote from the display device and wherein each of the automatically recorded programs is stored at the storage location.

19. The computer-readable storage memory device of claim 16,
wherein the automatically recorded programs are recorded at a network server.

* * * * *